United States Patent [19]
LaCoste et al.

[11] 3,979,104
[45] Sept. 7, 1976

[54] SHAFT SEALING DEVICE FOR A BUTTERFLY VALVE

[75] Inventors: Bernard L. LaCoste, Wilmington, Del.; Thomas H. McCloskey, Media, Pa.

[73] Assignee: Westinghouse Electric Corporation, Pittsburgh, Pa.

[22] Filed: Mar. 18, 1975

[21] Appl. No.: 559,464

Related U.S. Application Data

[63] Continuation of Ser. No. 434,322, Jan. 17, 1974, abandoned.

[52] U.S. Cl. .............................. 251/214; 277/61; 277/74
[51] Int. Cl.² .................................. F16K 31/44
[58] Field of Search ......... 251/304, 305, 308, 214, 251/215; 277/40, 15, 42, 61, 63, 59, 74, 88; 137/340

[56] References Cited
UNITED STATES PATENTS

| | | | |
|---|---|---|---|
| 1,826,212 | 10/1931 | Gremminger | 277/61 |
| 2,467,960 | 4/1949 | Brady, Jr. | 277/42 |
| 3,604,206 | 9/1971 | Baily | 277/15 |
| 3,642,024 | 2/1972 | LaCoste et al. | 137/340 |
| 3,740,057 | 6/1973 | Doyle et al. | 277/59 |

Primary Examiner—Martin P. Schwadron
Assistant Examiner—George L. Walton
Attorney, Agent, or Firm—G. H. Telfer

[57] ABSTRACT

A shaft seal device for a butterfly valve shaft wherein a friction face seal device having a flexible double bellows arrangement thereon is disposed within a seal chamber between a contaminated source of pressurized steam and a low pressure gland condenser. A buffer layer of uncontaminated steam having a pressure higher than the pressure of the contaminated steam is introduced into the seal chamber through conduit means. The buffer layer of uncontaminated steam having a pressure higher than the pressure of the contaminated steam is disposed between the contaminated steam source and the gland condenser to insure zero leakage of contaminated steam past the double bellows seal device into the gland condenser.

4 Claims, 2 Drawing Figures

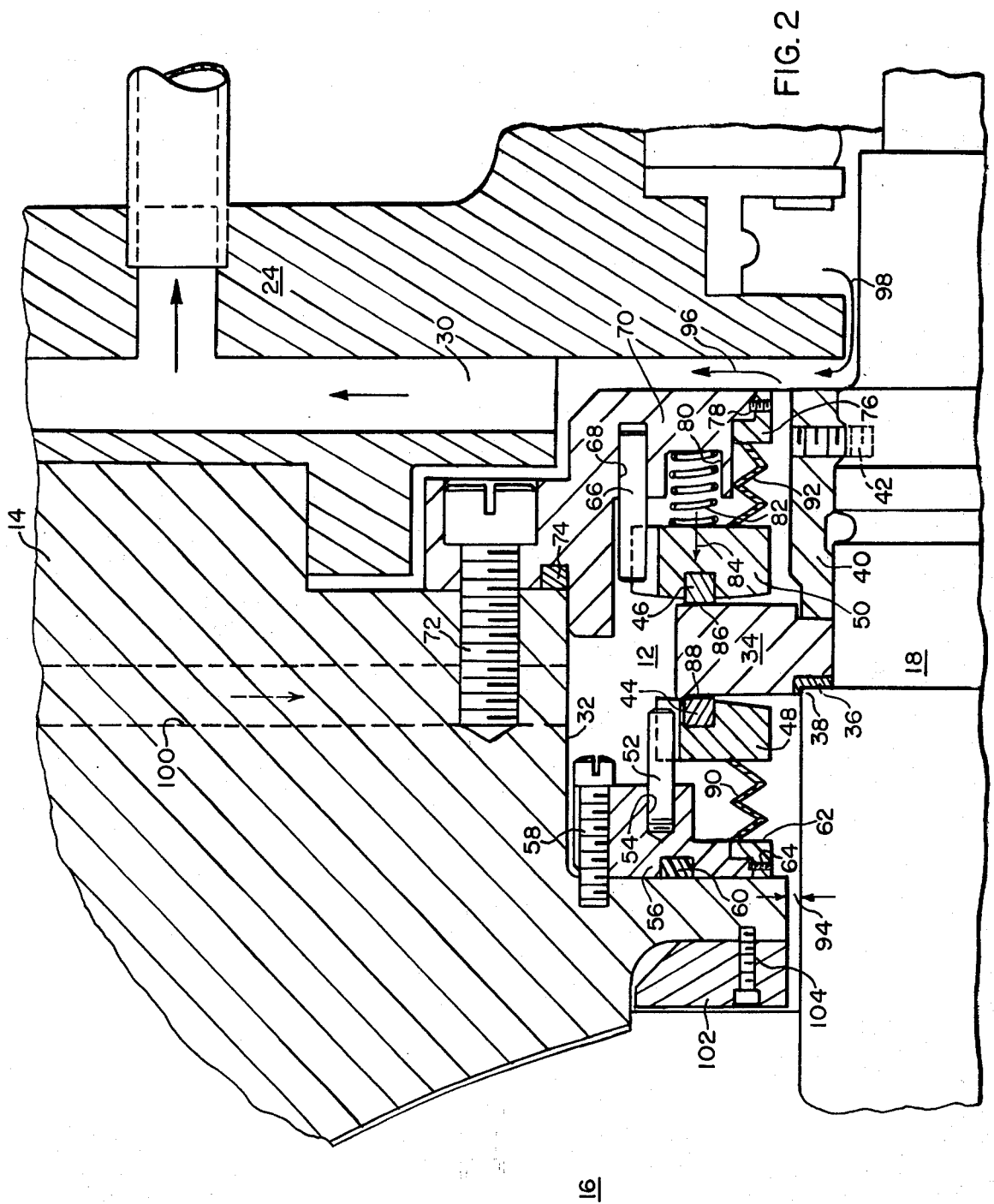

SHAFT SEALING DEVICE FOR A BUTTERFLY VALVE

This is a continuation of application Ser. No. 434,322 filed Jan. 17, 1974, now abandoned.

BACKGROUND OF THE INVENTION

1. Field of the Invention

This invention relates to the shaft-seal devices, and in particular, to a shaft-seal device for insuring zero leakage along the shaft of a butterfly valve.

2. Description of the Prior Art

In the operation of large turbine apparatus, emergency conditions sometimes arise which necessitate the sudden stoppage of the steam flow through the turbine system. For example, sudden loss of an associated electrical load connected to a generator apparatus requires that the steam flow within the turbine system be interdicted in a fraction of a second to prevent turbine overspeed. After the overspeed condition has been checked, steam entrapped ahead of the closed valves must be relieved through the turbine apparatus while reestablishing normal running speed. Therefore, the valves must have, in addition to a quick closing capability, the ability of reopening and controlling the steam flow against full steam pressure drop across the valve.

In the prior art, a valve able to operate under the high temperature, high pressure, and large fluid flow conditions within a large turbine apparatus so as to completely stop such flow in a small fraction of a second and yet be further capable of reopening and controlling the rate of flow of the fluid is described and claimed in U.S. Pat. No. 3,642,024, issued to LaCoste and Dawawala, and assigned to the assignees of the present invention. The valve therein described is of the butterfly type and is comprised of a cylindrical valve body having a butterfly disc rotatably disposed on a shaft member supported within the valve body.

As is well known to those skilled in the art, steam leakage along the rotating shaft of large turbine apparatus, or along the shaft of valve members, such as the butterfly valve device of the above-mentioned LaCoste and Dawawala patent, requires that suitable seal arrangements be provided to prevent excessive steam leakage along these shafts.

In a nuclear steam power plant utilizing a Boiling Water Reactor the leakage problem is even more acute. In the Boiling Water Reactor power plant, steam generated within the reactor element itself passes directly through an associated turbine apparatus. As a result of intensive, high-energy neutron bombardment within the reactor core, the steam so transmitted through the turbine apparatus is radioactive. It is obvious therefore that excessive leakage from the turbine shaft must be prevented. In addition, the valve apparatus must also be equipped with suitable seal devices to prevent the escape of radioactively-contaminated steam from the valve shaft.

In the above-mentioned LaCoste and Dawawala patent, a single bellows seal device was disposed between the valve shaft and a low pressure gland leakoff condenser. The leakoff condenser draws air coolant used to ventilate a bearing structure required by the butterfly valve therein described. The purpose of the bellows arrangement is to prevent contamination of the air coolant by the radioactive steam within the gland condenser.

Although the seal arrangement described in the above-mentioned LaCoste and Dawawala patent eliminated much of the leakage flow, recently promulgated Atomic Energy Commission Regulations, specifically TITLE 10, CODE OF FEDERAL REGULATIONS, Part 50, require that utilities restrict radioactive waste release to the environment to levels "as low as practicable". It is therefore evident that an improved seal device is required in order to meet the recently promulgated Regulations and to insure zero leakage of the radioactively-contaminated steam along the shaft of the valve device.

SUMMARY OF THE INVENTION

The present invention discloses a shaft seal arrangement for a rotatable shaft in a butterfly-type valve device. The shaft comprises a rotatable seal member attached to the rotatable shaft and a stationary seal member abutting said rotatable member with a friction interface. A flexible double-bellows extends between the stationary friction carbon seal members and the interior of a seal chamber. The double-bellows seal prevents communication between the radioactively contaminated steam within the butterfly valve and a gland-seal condenser which draws air coolant which has passed through a bearing assembly associated with the rotatable shaft. In order to insure zero leakage past the bellows arrangement, pressurized steam having a pressure greater than the pressure of the radioactively-contaminated steam is introduced to the seal chamber by suitable conduit means. Disposing a high-pressurized steam layer between a lower pressure source of contaminated steam and the gland condenser totally prevents leakage of the contaminated steam into the gland condenser.

It is an object of this invention to provide a shaft-seal arrangement for use with a rotatable shaft which insures zero steam leakage from a contaminated steam source into a gland condenser. It is a further object of this invention to provide a friction-seal arrangement having a double-bellows device thereon which utilizes a buffer layer of high pressure steam to insure zero leakage between a lower-pressure contaminated steam source and a low pressure gland condenser.

BRIEF DESCRIPTION OF THE DRAWINGS

The invention will be more fully understood from the following detailed description of an illustrative embodiment taken in connection with the accompanying drawings, in which.

DESCRIPTION OF THE PREFERRED EMBODIMENT

Figure 1:
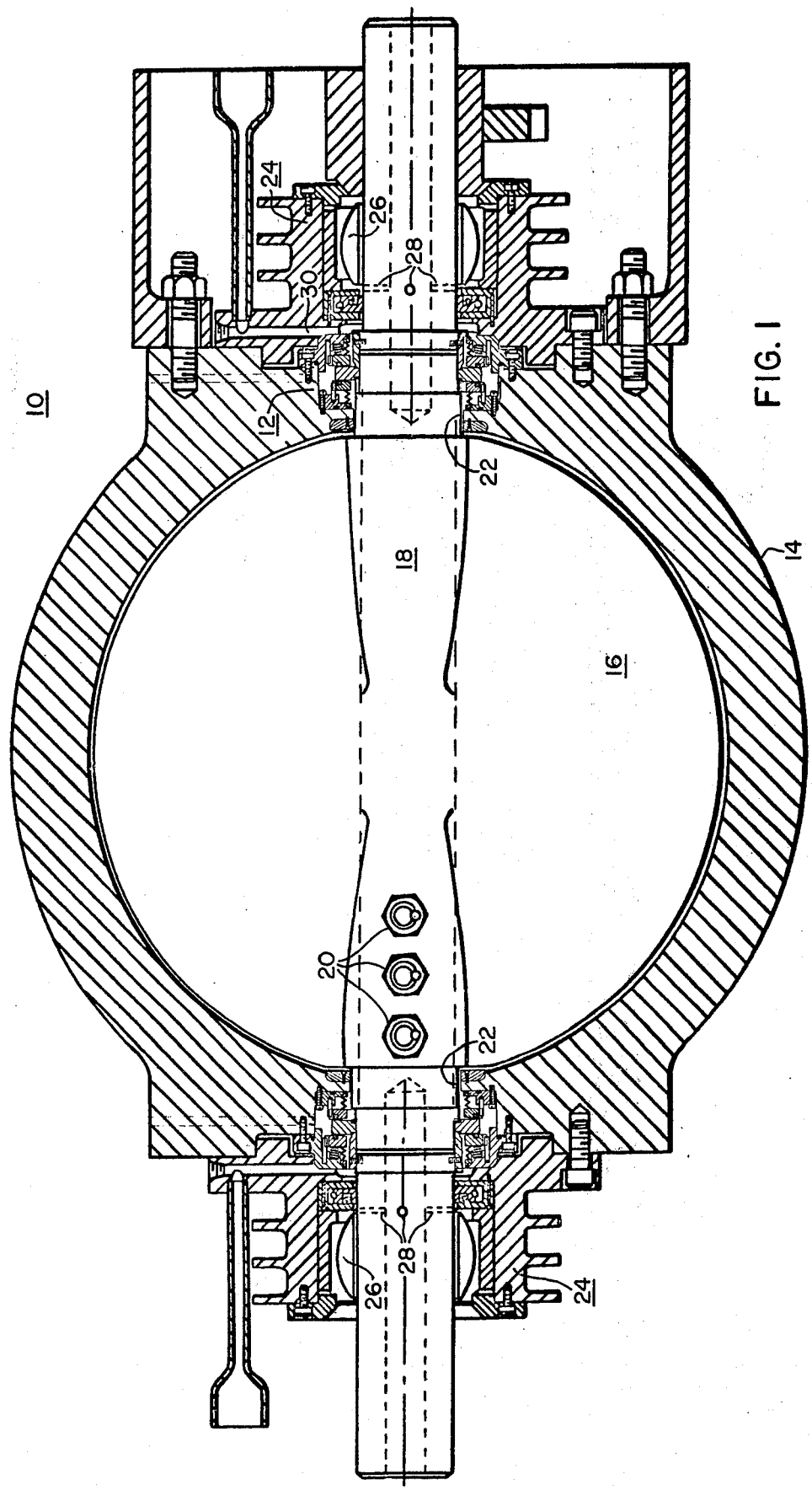
FIG. 1 is a sectional view of a butterfly valve utilizing a double-bellows seal arrangement taught by this invention; and, FIG. 2 is a sectional view of a double-bellows friction-face seal arrangement embodying the teachings of this invention.

Throughout the following description, similar reference characters refer to similar elements in all figures of the drawings.

Referring first to FIG. 1, an elevational view, entirely in section, of a butterfly valve 10 utilizing a seal arrangement 12 taught by this invention. Although the seal arrangement is shown as embodied with the rotatable shaft of a butterfly valve, it is to be understood that the teachings of this invention may be utilized to provide a seal device which insures zero leakage past any rotatable shaft.

In FIG. 1, the butterfly valve 10 comprises a substantially cylindrical valve body 14 having a butterfly valve disc 16 rotatably supported on a valve shaft 18 within the body member 14. The butterfly valve disc 16 is attached to the rotatable valve shaft 18 by a series of fastening nuts 20.

The rotatable valve shaft 18 passes through openings 22 disposed on opposite sides of the body member 14. The rotatable valve shaft 18 extends centrally and axially through a bearing housing 24 disposed on opposite sides of the valve body member 14. The shaft 18 is rotatably supported at each end thereof within the bearing housing 24 on an air-cooled Teflon bearing 26.

Conduits 28 are located within that portion of the rotatable shaft 18 which is disposed within the bearing housing 24 and provide passages through which the ventilating air is introduced into the Teflon bearings 26. A gland-leakoff chamber 30 is disposed within the bearing housing 24 and is connected through suitable conduits to a gland condenser (not shown). The gland condenser is maintained at a pressure usually below atmospheric pressure and draws thereinto the ventilating fluid which has passed through the Teflon bearings 26.

The seal device 12 comprising a friction-face double-bellows seal arrangement is disposed along the rotatable shaft 18 and prevents the passage of steam out of the body member 14 along the rotatable shaft 18.

In the prior art, if steam leakage from within the valve body member 14 leaked past the valve seal arrangement, the gland condenser leak-off 30 would accept both the valve shaft steam leakage and the ventilating air from the atmosphere. In the gland condenser, the steam would be recycled and the air ejected back to atmosphere.

However, in a nuclear reactor power plant, and especially those nuclear power plants utilizing a Boiling Water Reactor, steam is vented directly from the reactor into the turbine. This steam, due to the intense bombardment of high energy neutrons within the reactor element, is radioactively contaminated. If this radioactively-contaminated steam were permitted to mix with the atmospheric ventilating air in the gland condenser, a large and expensive off-gas system would be required to decontaminate this air before it can be expelled back to the atmosphere. It is evident then, that in the nuclear reactor steam power plant, leakage of the radioactively-contaminated steam into the gland condenser is to be prevented.

In the prior art, a single-bellows arrangement is disposed in a position occupied by the present invention. Although steam leakage is very small past the single-bellow seal arrangement of the prior art, recently promulgated Atomic Energy Commission Regulations require that radioactive waste release levels be "as low as practicable". An example of the prior art utilizing a single-bellows seal arrangement to prevent leakage of steam from the interior of the valve along the rotatable valve shaft is U.S. Pat. No. 3,642,024, issued to LaCoste and Dawawala, and assigned to the assignees of the present invention.

Referring now to FIG. 2, an elevational view entirely in section of the friction-face double-bellows seal arrangement 12 is shown. The seal arrangement 12 is disposed within the valve body member 14. A seal chamber 32 is defined on the interior of the body member 14. The friction-face double-bellow seal arrangement 12 is disposed within the seal chamber 32.

An annular mating ring 34 is disposed within the seal chamber 32 and surrounds the rotatable shaft 18. A packing ring 36 is disposed between a shoulder 38 of the rotatable shaft 18 and the mating ring 34. The packing ring 36 prohibits passage of steam into the interior of the body member 14 along the rotatable shaft 18. The mating ring 34 is secured to the rotatable shaft 18 by a sleeve member 40. The sleeve member 40 is secured into the rotatable shaft 18 by a pin 42. As is seen from the drawing, the mating ring 34, the packing ring 36, and the sleeve 40 rotate with the rotatable shaft 18.

A first carbon seal ring 44 and a second carbon gland seal ring 46 are supported against the mating ring 34 by a first seal ring support structure 48 and a second seal ring support structure 50, respectively. The first carbon seal ring 44 and its associated support structure 48 are maintained in position against the mating ring 34 by an anti-rotation pin 52. The anti-rotation pin 52 extends into an opening 54 within a first baffle support 56. The first baffle support 56 is secured within the seal chamber 32 by suitable means, such as a screw 58. A packing ring 60 is disposed between the first baffle support 56 and the valve body member 14. An end ring 62 is attached to the first baffle support ring 56 by suitable means, such as a screw 64.

The second carbon seal ring 46 is maintained in position against the mating ring 34 by an anti-rotation pin member 66 which extends through an opening 68 within a second baffle support 70. The second baffle support 70 is attached to the body member 14 by suitable means, such as a screw 72. The second baffle support member 70 lies between the valve body member 14 and the bearing housing 24. A packing ring 74 is disposed between the second baffle support ring 70 and the body member 14. The packing 74 prevents leakage out of the seal chamber 32. A second end ring 76 is attached to the second baffle support ring 70 by suitable means, such as a screw 78.

A groove 80 extends into the second baffle support ring 70 and receives a compression spring 82. The compression spring 82 extends between the second seal ring support structure 50 and the second baffle end ring 70. The spring 82 provides a force acting in a direction 84 and exerts a force on the second seal ring support structure 50 which maintains the second carbon seal ring 46 in a close contact interface 86 with the mating ring 34.

A first flexible bellows arrangement 90 extends between the first end ring 62 and the first carbon seal support structure 48. A second flexible bellows arrangement 92 extends between the second end ring 76 and the second carbon seal support structure 50. The first flexible bellows 90 and the second flexible bellows 92 are fabricated of a thin resilient metallic member, such as metal foil. The first carbon seal ring 44 and the second carbon seal ring 46 are highly polished so that tight seal interfaces 86 and 88 exist between the carbon seal rings 44 and 46 and the mating ring 34.

As seen from the drawings, as the rotatable shaft 18 moves, carrying with it the mating ring 34 and its associated structures, abrasion between the first carbon seal ring 44 and the mating ring 34 along the seal interface 88 wears the first carbon seal ring 44 and generates minute voids between the first carbon seal ring 44 and the mating ring 34 along the seal interface 88.

Similarly, as the mating ring 34 rotates with the rotatable shaft 18, abrasion between the second carbon seal ring 46 and the mating ring 34 at the seal interface 86 abrades and wears the second carbon seal ring 46. Thus, minute voids develop between the second carbon sealing 46 and the mating ring 34 along the seal interface 86.

It is therefore possible that steam leakage from the interior of the valve body 14 can pass between a clearance space 94 that lies between the valve body 14 and rotatable shaft 18. Such leakage of contaminated steam may then pass between the minute voids developed by abrasion at the interface 88 between the first carbon seal ring 44 and the mating ring 34. Radioactively contaminated steam disposed within the seal chamber 32 could pass similarly through the minute voids developed by abrasion at the interface 86 between the second carbon seal ring 46 and the mating ring 34. Radioactively contaminated steam can then pass, as illustrated by arrows 96, into the gland condenser leakoff 30. If radioactively contaminated steam were permitted to mix with the air coolant flow 98 from the Teflon bearings 26 (FIG. 1) into the gland condenser leakoff 30, an expensive system of purification of the intermixed radioactively contaminated steam and air coolant must be provided However, a buffer layer of pressurized, uncontaminated steam is introduced into the seal chamber 32 through a suitable conduit 100. The conduit conducts steam from a steam generator source (not shown) into the seal chamber 32. Steam passing into the seal chamber 32 from the conduit 100 is maintained at a pressure higher than the pressure of the contaminated steam from within the body member 14. It is thus seen, that the volume defined within the seal chamber 32 and bounded by the flexible bellows 90 and 92, the bellows support 56 and 70, and the mating ring 34 is filled with a buffer layer of uncontaminated high pressure steam. It is thus obvious, that contaminated steam leakage into the seal chamber 32 by passage through the minute voids at the seal interface 88 between the first carbon seal ring 44 and the mating ring 34 is prevented. It can also be seen that the contaminated steam from within the body member 14 cannot pass along the shaft 18 due to the presence of the packing 36 between the mating ring 34 and the shaft 18.

Utilization of the friction-face seal rings 44 and 46 to provide the seal interfaces 86 and 88 between the seal rings 44 and 46 and the mating ring 34, and in addition, providing a pressurized layer of uncontaminated steam within the seal chamber 32, insures that no leakage of contaminated steam will pass from the interior of the valve body 14 into the leakoff 30 of the gland condenser.

It is apparent from the drawings that the combination of the friction-face seal rings 44 and 46 abutting against the mating ring 34 and the pressurized layer of uncontaminated steam prevent contaminated leakage from within the body member 14 to the leakoff 30 of the gland condenser (not shown). That the friction-face seal rings 44 and 46 and the mating ring 34 alone would not be sufficient to prevent all leakage from the interior of the body member 14 is apparent. Since the abrasion of the surfaces along the seal interfaces 86 and 88 create small voids through which contaminated steam may pass, pressurized uncontaminated steam at a pressure higher than the pressure of the contaminated steam is required to insure complete sealing. Thus, friction face seal interfaces are insufficient for the purposes of the butterfly valve shaft sealing application.

In addition, utilization of only pressurized uncontaminated steam to form a buffer layer between the contaminated steam flow and the leakoff is not a solution applicable to the problem presented in the case of the butterfly valve. Since the butterfly valve is exposed to the full pressure drop of the steam across it when reopening, provision in the structure of the valve itself must be made to accommodate large deflections of the valve disc 16 or the rotatable shaft 18. It is for this reason that the relatively large clearance space 94 exists between the rotatable shaft 18 and the body member 14. Given that the large clearance distance 94 is required, utilization of only a pressurized uncontaminated steam layer within the seal chamber 32 between the contaminated steam within the body member 14 and the gland leakoff 30 is not practicable.

Since the large shaft clearance 94 is necessary to allow for large shaft deflections under pressure loading of the disc 16 or shaft 18, the volume of uncontaminated steam which would be required to maintain a totally leak-free valve is prohibitive. Thus for example, references in the prior art which dispose a pressurized buffer fluid between a contaminated fluid and atmosphere inapposite to the leakage problems presented when using a butterfly valve in a nuclear steam power plant. An example of the prior art utilizing a pressurized fluid between a contaminated fluid is U.S. Pat. No. 3,604,206.

That above-mentioned patent utilizes an uncontaminated pressurized fluid which flows into the source of the contaminated fluid and into the second uncontaminated fluid. If such a technique were to be utilized as a solution to the instant problem, steam generating capacity sufficient to provide a layer of uncontaminated pressurized steam at the pressure level required is beyond the range of those generator units used for providing sealing steam. A valve device utilizing the teachings of the present invention requires a minimum clean steam generator flow capacity since there is no flow of uncontaminated steam into the valve body 14 or into the clean leakoff 30. Thus, the steam generator for utilization with the valve embodying the teachings of this invention would provide only that amount of steam which is necessary to fill the seal chamber at a pressure sufficient to prevent leakage from within the valve 14 into the gland leakoff 30.

In addition, since the large clearance spaces 94 are required to accommodate large shaft deflection, the labyrinth or packing gland seals usually utilized for rotatable shafts are not applicable to reduce the leakage flow from within the valve 14.

It is thus seen that a seal device embodying the teachings of this invention prevents radioactive recontaminated steam from within the valve body member 14 from mixing with ventilating air passing into the gland condenser leakoff 30. Thus, the ventilating air flowing into the gland condenser through leakoff 30 can be expelled to atmosphere without the requirement of an expensive off-gas decontaminating system since the ventilating air has not been contaminated with radioactive steam.

Since the uncontaminated steam pressure within the seal chamber 32 is always greater than the pressure of the contaminated steam within the valve 10, contaminated steam is prevented from intermixing with the coolant air passing through the leakoff 30 into the gland condenser. In addition, since there is no flow of uncontaminated high pressure steam into the valve 10, capacity of the uncontaminated steam generator is held within practical limits.

It is also apparent that utilization of the flexible resilient double-bellows friction-face seal with a pressurized uncontaminated buffer zone provides a flexible seal arrangement which can follow large shaft deflections encountered in use of the butterfly valve yet at the same time maintain zero leakage of contaminated steam from within the valve along the rotatable valve shaft.

We claim as out invention:

1. A butterfly valve for a steam turbine power plant comprising:
   a valve casing defining a valve chamber therein,
   a butterfly valve shaft mounted on a bearing for reciprocating angular rotation within said valve casing,
   a butterfly valve disc mounted on said butterfly valve shaft for movement within said valve chamber, and,
   a seal device for preventing leakage of a pressurized fluid from within said valve chamber along said butterfly valve shaft, said seal device being disposed within a seal chamber defined by said valve casing and said shaft and including a rotatable seal assembly mounted on said shaft and a stationary seal assembly mounted on said valve casing,
   said rotatable seal assembly comprising an annular mating ring attached to said shaft,
   said stationary seal assembly comprising first and second annular seal rings in contact with opposing surfaces of said annular mating ring to form first and second friction face seal interfaces respectively therebetween,
   said stationary seal assembly further comprising first and second resilient bellows members disposed between said first and second annular seal rings, respectively, and said valve casing,
   said first bellows member, said first annular seal ring and said annular mating ring defining a first region communicating with said valve chamber and containing a pressurized fluid to be contained therein by said seal device,
   said second bellows member, said second annular seal ring and said annular mating ring forming a second region adjacent said second seal interface which communicated with a fluid for cooling said bearing, which fluid is sought to be not contaminated by fluid from said valve chamber,
   said first and second bellows members, said first and second annular seal rings and said annular mating ring defining, on the side thereof opposite to said first and second regions, a third region filled with a fluid pressurized to a pressure greater than that of either said fluid in said valve chamber or said bearing coolant fluid to prevent contamination of said bearing coolant fluid by said fluid in said valve chamber.

2. The butterfly valve of claim 1, wherein said shaft-mounted seal assembly further comprises an annular packing seal disposed between said mating ring and said butterfly valve shaft, said annular packing seal preventing leakage of said pressurized fluid from within said valve chamber between said annular mating ring and said butterfly valve shaft.

3. The butterfly valve of claim 1, wherein said annular seal rings are fabricated of a highly polished carbon material.

4. The butterfly valve of claim 1, wherein bias means for maintaining said friction-face seal interfaces between said annular seal rings and said shaft-mounted seal assembly is disposed within said seal chamber.

* * * * *